Aug. 3, 1948.    E. W. DAUM    2,446,363
COMBINATION POSITIVE CLUTCH AND TORQUE
RESPONSIVE FRICTION COUPLING
Filed March 23, 1945

INVENTOR.
Edwin W. Daum

BY Arthur H Robert
    Atty.

Patented Aug. 3, 1948

2,446,363

UNITED STATES PATENT OFFICE 2,446,363

COMBINATION POSITIVE CLUTCH AND TORQUE RESPONSIVE FRICTION COUPLING

Edwin W. Daum, Louisville, Ky., assignor to James Clark Jr., Electric Company, Louisville, Ky., a corporation of Kentucky Application March 23, 1945, Serial No. 584,461

2 Claims. (Cl. 192—48)

This invention relates to portable power-driven tools of the type using an electric motor to drive a spindle and having an axially-separable normally-open jaw clutch interposed between the spindle and the motor. The invention is herein specifically described as applied to a portable power-driven screw driver, although it is obviously applicable to portable power-driven drills, nut-turning devices and the like.

In portable power driven screw drivers and like tools of this type, the motor drive shaft is rigidly connected to the driving member of the clutch to form a rotatable driving unit, while the driven member of the clutch is rigidly connected to the spindle to form a rotatable driven unit. These units are relatively movable axially toward and away from each other into and out of the clutch closed and open positions but are normally maintained in the clutch open position by a spring. Consequently, when a screw driver of this type is placed in use, the driving unit rotates continuously, while the driven unit remains stationary until the screw driver bit, which is removably mounted in the spindle, is placed in engagement with the head of a screw and the tool as a whole pressed toward the screw so as to move the driving unit axially toward the driven unit sufficiently to close the clutch.

With the clutch closed, the driven unit rotates, driving the screw home. This imposes a normal working load on the motor, which is uniform for any one screw but of a magnitude which varies with screws of different sizes and with screw threads of different classes in each size. When the screw is driven home, its resistance to turning increases sharply; hence, the load it imposes on the motor increases in a like manner. This increase in load, if uncontrolled, would result in damage to the parts being fastened, or to the screw, or to the tool. To control it, the clutch is purposely designed so that, when the load increases to a predetermined or breakdown point, the clutch jaws of the driving unit ride over the clutch jaws of the driven unit and thus prevent the load from increasing beyond the predetermined breakdown point. When the clutch rides over, it causes the driving unit to reciprocate or vibrate axially inward and outward to a limited extent but at a rapid rate and subjects the driven unit and screw to a rapid succession of rotational impacts, which causes the breakdown load to fluctuate. These actions have the objection of causing the screw driver to chatter and sometimes "walk" away from the screw incurring the danger of burring the head of the screw and of marring the work being fastened together. Furthermore, since the fluctuating breakdown load is the same for all screws, while the normal uniform working load varies with screws of different sizes and with screw threads of different classes in each size, it follows that the predetermined breakdown load of a screw driver imposes progressively increasing strains upon progressively "smaller screws" i. e. screws imposing progressively decreasing working loads. This necessarily limits the useful range of a given screw driver.

The principal object of the present invention is to provide a portable power-driven tool of the "ride-over" type which is of novel, simple and sturdy construction and in which chatter and axial vibration are completely eliminated.

Another important object is to provide such type of tool with a clutch which will "ride-over" smoothly and quietly at a predetermined breakdown load and maintain that load at a uniform value.

A further object is to effect a substantial increase in the useful range of such type of tool through the provision of manually operable means for adjusting the breakdown point of the clutch over a wide range so that it may be set to "ride-over" at the maximum breakdown load for screws normally imposing the largest working loads and at progressively smaller breakdown loads for screws normally imposing progressively smaller working loads.

An embodiment of the invention is illustrated in the accompanying drawing wherein.

Figure 1:
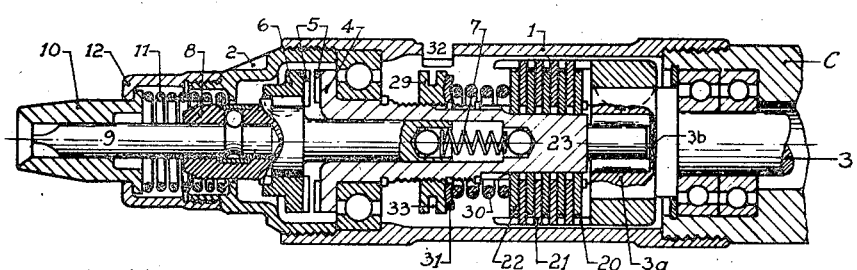
Figure 1 is a longitudinal central sectional view of a screw driver embodying the invention, with the parts thereof in their relatively inoperative or idling position.
Figure 4:
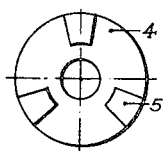
Figures 4 and 5 are opposite end elevations of the part shown in Figure 3.
Figure 3:
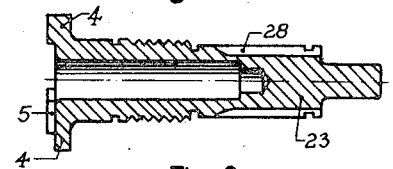
Figure 3 is a longitudinal sectional view of that axial part of the driving unit which terminates at one end in the driving clutch member.
Figure 5:
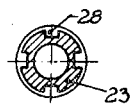
Figure 2:
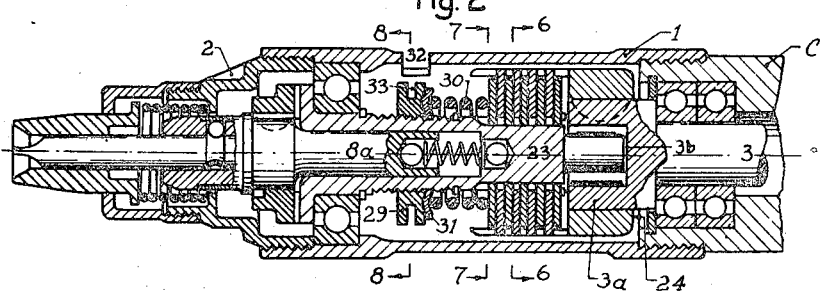
Figure 2 is a similar view with the parts in their operative position.
Figure 6:
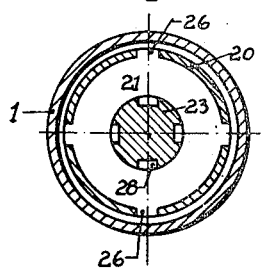
Figure 6 is a section along line 6—6 of Figure 2.
Figure 7:
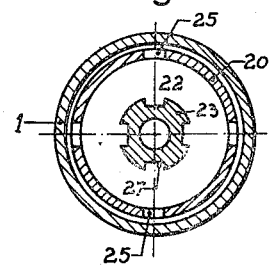
Figure 7 is a section along line 7—7 of Figure 2.
Figure 8:
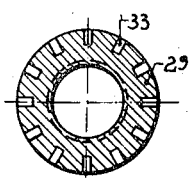
Figure 8 is a section along line 8—8 of Figure 2.

The screw driver illustrated includes: a housing I having a drive end and a driven end, the drive end being connected to one end of a casing C which houses the power supplying mechanism and the driven end terminating in a tapered shoulder section 2; a power shaft 3 extending from casing C into the drive end of the housing 1 and being connected, within casing C, to a suitable motor such as an electric motor not shown; a jaw clutch composed of a driving member 4 and an axially aligned and axially movable driven member 6 arranged with their adjacent end faces in opposed relationship, each member having, on their adjacent end faces, a number of axially extending jaws 5 symmetrically spaced apart, as for example, three such jaws whose radial centers are spaced 120° apart; a spring 7 resiliently urging the driven clutch member 6 axially away from the driving clutch member 4 to the clutch open position in which the driving jaws 5 cannot engage the driven jaws; a bit spindle 8 upon which the driven clutch member 6 is mounted; a screw driver bit 9 mounted in the spindle 8; an axially movable thimble 10 surrounding the projecting end of the bit 9 and resiliently urged outwardly by spring 11; and a thimble retaining nut 12 threaded to the tapered section 2 of the housing.

The power shaft 3 and the driving member 4 of the clutch are a part of the driving unit while the driven member 6 of the clutch and the bit spindle 8 constitute the driven unit, these units being resiliently held in the clutch open position by the spring 7.

In use, the driving unit of tools of this general type normally rotates continuously while the driven unit remains stationary so long as the jaw clutch remains open. When the thimble 10 is placed over the head of a screw to guide the screw driver bit 9 on to the screw head and the housing 1 pressed inwardly toward the screw so as to move the driving unit axially toward the driven unit and into the closed position of the clutch, the driven unit is rotated to drive the screw home. The thimble 10 moves axially into the retaining nut 12 against the action of spring 11 as the screw is driven into the parts being fastened together. When the screw is driven home, its resistance to further turning increases sharply and normally reaches a value sufficient to stop further rotation of the driven unit. Accordingly, to prevent damage to the tool, the power connection must be broken.

Heretofore this has been accomplished by permitting the driving jaws 5 of the clutch to "ride-over" the driven jaws 5. In doing this, it will be apparent that the housing 1 and all other parts except the clutch spindle unit must move axially away from the screw sufficiently to disengage the driving and driven jaws 5 momentarily, whereupon the driving jaws 5 move rotationally to the next space between driven jaws and then axially into that space in which they rotate until they strike the driven jaws at the end of such space where they again move axially rearward in repeating the foregoing sequence. This causes axial vibration and chatter and subjects the driven unit to a rapid succession of rotational impacts.

In accordance with my invention, chatter and axial vibration are avoided by connecting the drive shaft 3 to the driving clutch member 4 by means of an interposed disc clutch. This clutch comprises: an outer driving member in the form of sleeve 20; a set of axially spaced driving plates or discs 21; an interposed set of axially spaced driven discs 22; and an inner shaft 23. The driving discs are preferably made from non-ferrous metals and the driven discs from ferrous metals but this may be reversed or other unlike metals employed.

The outer sleeve 20 is formed by the cylindrical side wall of a cup shaped member which is centrally bored through its bottom wall 24 to receive the enlarged end 3a of power shaft 3. The enlarged end 3a of the shaft is keyed to the cup shaped member to rotate it. To cause the outer sleeve 20 to drive the driving discs 21, the sleeve is provided with four axially extending slots 25 rotationally spaced 90° apart, while the discs 21 are provided with outwardly extending lugs 26 which are similarly spaced to extend into the slots 25.

To cause the driven plates 22 to drive the inner shaft 23, each driven plate 22 is provided with four inwardly extending lugs 27 rotationally spaced 90° apart while the periphery of the inner shaft 23 is provided with four axially extending recesses 28 which are similarly spaced to receive the lugs 27. The inner shaft is formed integrally with the driving clutch member 4 and extends rearwardly therefrom. Its rear end is conveniently supported by roller bearings in a recess 3b centrally bored in the enlarged end 3a of shaft 3. The opposite end of the inner shaft 23, is bored to provide a convenient support for the axially movable bit spindle 8 which is, therefore, provided with a rearward extension 8a projecting into the bore of the inner shaft 23. The clutch spring 7 is placed within the bore of inner shaft 23 between the bottom of that bore and the extension 8a.

The foregoing makes apparent that when the power shaft is rotated, with the jaw clutch open, the driving unit is rotated as before except that power is transmitted from shaft 3 through the disc clutch to the jaw clutch member 4. When the tool is pressed into operative engagement with the work, the jaw clutch will be closed and the driven unit will be rotated as before. Consequently, a screw may be driven home in the normal manner. When the screw is driven home, the load increases sharply up to the breakdown point of the disc clutch. At this point, the screw holds the driven discs against further rotation while the driving discs continue to rotate and thus "ride-over" the driven discs while maintaining continuous and uniform frictional engagement therewith. It will be appreciated that this is done smoothly and quietly eliminating axial vibration and chatter and maintaining the breakdown load at a uniform value.

In further accordance with my invention, manually operable adjusting means are provided for varying the breakdown point of the disc clutch through a relatively wide range of break-down loads. Consequently, when the working load imposed by a particular screw is low, the adjusting means may be manipulated to loosen the disc clutch to a degree such that it will institute "ride-over" at a breakdown load which is a little higher than the normal load imposed by that screw. Where higher working loads are imposed by other screws, the adjusting means may be manipulated to tighten the disc clutch to a breakdown point sufficiently above such higher working load as will enable the tool to operate satisfactorily. In this way the tool may be readily adjusted to meet a wide variety of different working conditions.

To permit adjustment of the disc clutch, the slots 25 in the outer sleeve 20 and the recesses 28 in the inner shaft 23, are extended axially, beyond the limits of the space occupied by the discs 21 and 22 when they are compressed together, to a slight extent which is ample for disc tightening and loosening purposes. The adjusting means include: an adjusting nut 29 threaded to the inner shaft 23; and a spring 30 interposed between this nut and the adjacent end of the disc clutch. Thus by rotating the nut 29 in one direction or the other the pressure between the discs of the disc clutch may be increased or decreased. A lock washer 31 between the spring 30 and adjusting nut 29 will normally lock the nut in its adjusted position sufficiently to prevent it from rotating out of such position without at the same time, interfering with the making of a desired adjustment. The adjustment may be made manually through the slot 32 in the housing 1 by inserting a lever through the slot 32 into an adjacent opening 33 of the adjusting nut 29 and turning the nut in the desired direction, the periphery of the nut being provided with a series of openings 33.

I claim:

1. A power-driven tool of the "ride-over" type, comprising: a rotatable power shaft; a rotatable spindle; a main clutch for connecting the spindle to and disconnecting it from the shaft, said clutch having a rotatable driving member connected to the shaft, a rotatable driven member connected to the spindle; means yieldably urging the driven member axially toward the clutch disconnecting position, the driven member being moved bodily to the connecting position when the tool is pressed into operative engagement with the work; a "ride-over" clutch having frictionally-engaging rotatable driving and driven elements pressing against each other and being interposed in the connection between and connected respectively to the power shaft and the driving member of the main clutch, said driving elements being arranged, when a predetermined breakdown load is imposed on the driven elements, to "ride-over" the driven elements while maintaining continuous and uniform frictional engagement therewith; and means for adjusting the breakdown point of the "ride-over" clutch to cause it to "ride-over" at any load within a predetermined range of breakdown loads including an adjusting nut threaded to said driving member between the main clutch and the "ride-over" clutch and a spring encircling said driving member between the adjusting nut and the "ride-over" clutch, said spring being arranged to increase and decrease the pressure between the elements of the "ride-over" clutch as the nut is screwed on the driving member toward and away from the "ride-over" clutch.

2. A power-driven tool of the "ride-over" type comprising: a main clutch composed of a rotatable driving member, a rotatable driven member arranged for axial movement into and out of driven engagement with the driving member, and a spring yieldably urging said members out of such engagement, the driving member being moved bodily to the connection position when the tool is pressed into operative engagement with the work; a rotatable power shaft terminating in a central portion and an outer cylinder which extends axially forward; a rotatable inner shaft projecting forwardly from the power shaft, with its rear end rotatably supported on said central shaft portion and separated from said outer cylinder by an annular space, and with its front end connected to said driving member for rotation therewith; a spindle operatively connected to the driven clutch member for rotation and axial movement therewith; a "ride-over" clutch having frictionally engaging rotatable driving and driven elements positioned within said annular space to press against each other, the driving elements being connected to said outer cylinder for rotation therewith and the driven elements being connected to said inner shaft to rotate said shaft when driven by said driving elements through the frictional engagement therebetween, the pressure between such elements being of a predetermined value such that when a predetermined breakdown load is imposed on the driven elements, the driving elements "ride-over" the driven elements while maintaining continuous and uniform frictional engagement therewith; and means for adjusting the breakdown point of the "ride-over" clutch to cause it to "ride-over" at any load within a predetermined range of breakdown loads including an adjusting nut threaded to said inner shaft between the main clutch and the "ride-over" clutch and a spring encircling said inner shaft between the adjusting nut and the "ride-over" clutch, said spring being arranged to increase and decrease the pressure between the elements of the "ride-over" clutch as the nut is screwed on the inner shaft toward and away from the "ride-over" clutch.

EDWIN W. DAUM.

REFERENCES CITED

The following references are of record in the file of this patent:

UNITED STATES PATENTS

| Number | Name | Date |
|---|---|---|
| 1,442,123 | Brown | Jan. 16, 1923 |
| 1,564,342 | Gebhardt et al. | Dec. 8, 1925 |
| 1,839,648 | Connell | Jan. 5, 1932 |
| 1,858,276 | Miller | May 17, 1932 |
| 1,984,282 | Ray | Dec. 11, 1934 |
| 2,184,394 | Moretti | Dec. 26, 1939 |

FOREIGN PATENTS

| Number | Country | Date |
|---|---|---|
| 485,885 | Germany | Nov. 11, 1929 |